United States Patent [19]
Itou

[11] Patent Number: 5,817,897
[45] Date of Patent: Oct. 6, 1998

[54] WAX-LIKE SUBSTANCE FOR USE AS A DURABLE MARKING COMPOSITION OR IN PRODUCING SHAPED ARTICLES FOR MOLDING

[76] Inventor: Nabhikhi Itou, 36-21, 3-chome Ninomiya, Fukui-shi Fukui 910, Japan

[21] Appl. No.: 524,860

[22] Filed: Sep. 7, 1995

[51] Int. Cl.$^6$ .................................................. C08L 91/06
[52] U.S. Cl. ................................. 585/9; 585/2; 208/20; 106/19 R; 106/22 A; 106/19 B; 106/19 E
[58] Field of Search .................. 106/19 R, 22 A, 106/19 B, 19 E; 585/9, 2; 208/20

[56] References Cited

U.S. PATENT DOCUMENTS

| | | | |
|---|---|---|---|
| 2,882,246 | 4/1959 | Leatherman et al. | 260/28.5 |
| 3,491,043 | 1/1970 | Zmitrovis | 260/23.5 |
| 3,903,950 | 9/1975 | Lirones . | |
| 3,933,708 | 1/1976 | Brinkman | 260/23 H |
| 4,060,569 | 11/1977 | Woods et al. | 260/683.15 |
| 4,212,786 | 7/1980 | Murakami | 260/31.2 R |
| 4,230,501 | 10/1980 | Howard et al. | 106/308 Q |
| 4,239,546 | 12/1980 | Russell et al. | 106/270 |
| 4,714,496 | 12/1987 | Luken, Jr. et al. | 106/270 |
| 5,055,498 | 10/1991 | Brachman | 523/164 |
| 5,449,399 | 9/1995 | Tsuei et al. | 106/19 B |

FOREIGN PATENT DOCUMENTS

| | | |
|---|---|---|
| 2255977 | 7/1975 | France . |
| 52-13133 | 7/1950 | Japan . |
| 49-19241 | 5/1974 | Japan . |
| 52-54529 | 5/1977 | Japan . |
| 52-26557 | 7/1977 | Japan . |
| 55-88948 | 7/1980 | Japan . |
| 56-47463 | 4/1981 | Japan . |
| 58-204069 | 11/1983 | Japan . |
| 59-75963 | 4/1984 | Japan . |
| 59-174668 | 10/1984 | Japan . |
| 62-201981 | 9/1987 | Japan . |
| 64-60659 | 3/1989 | Japan . |
| 3-119073 | 5/1991 | Japan . |
| 3-44586 | 7/1991 | Japan . |
| 4-33970 | 2/1992 | Japan . |

OTHER PUBLICATIONS

Database WPI, Section Ch, Week 9527, Derwent Publications Ltd., London, GB; Class A17, AN 95–205530 & TW–A–245 678 (Itou M), 21 Apr. 1995—abstract.
Patent Abstracts of Japan vol. 009 No. 237 (C–305), 24 Sep. 1985 & JP–A–60 096622 (Dainichi Seika Kogyo KK) 30. May 1985—abstract.

*Primary Examiner*—Walter D. Griffin
*Assistant Examiner*—Nadine Preisch
*Attorney, Agent, or Firm*—Jordan and Hamburg

[57] ABSTRACT

A wax-like substance mainly consisting of a saturated chain hydrocarbon, in which a weight ratio (C/H) of carbon and hydrogen is 5.839–6.018, a total weight % of the carbon and the hydrogen is 98.5%–100%, a number-average molecular weight (Mn) is $3.0\times10^3$–$1.0\times10^4$, a weight-average molecular weight (Mw) is $1.0\times10^4$–$5.0\times10^4$ and Mw/Mn is 1.0–5.0. In the case of using it for carving and casting, for example, wax-like substance can be repeatedly used, and has the excellent workability. Moreover, the wax-like substance provides easy dewaxing from a mold material. In other words, it provides convenient use. In addition, after a master model is made by processing the wax-like substance and covered with a mold material, it is dewaxed. Molten metal is poured into the mold material, and a shaped article is produced by cooling and solidifying the mold material where the molten metal has been poured. As a result, shaped articles, such as a decoration having a very fine pattern, an accessory having a complicated and three-dimensional configuration, or an industrial art object can be suitably produced.

18 Claims, 4 Drawing Sheets

WAX-LIKE SUBSTANCE FOR USE AS A DURABLE MARKING COMPOSITION OR IN PRODUCING SHAPED ARTICLES FOR MOLDING

BACKGROUND OF THE INVENTION

The present invention relates to a wax-like substance which is used for casting, carving, or as marking substance, etc. and a molding method using the wax-like substance.

A so-called wax-mold casting method has been used as a molding method for shaped articles, such as decorations having very minute patterns, and accessories having complicated and cubic configurations.

The above-mentioned wax-mold casting method is a method for producing shaped articles, which are carried out under the following procedures by using the wax-like substance. In other words, a wax-like substance having a block-like configuration, etc. is first processed to have a desired configuration by using processing tools for woodwork, etc., such as a chisel, a cutter, a saw, a file. Next, a master model made by the above-mentioned process is covered with a heat-resistant mold material in which a runner for dewaxing and casting is formed. Then the wax-like substance which is the master model is melted by heating the mold material from the outside so that it is poured out (dewaxed) from the runner. Successively, the wax-like substance which remains in the mold material is vaporized, and desired metal is poured into the mold material (mold), whose inside is hollow, through the runner. Then the metal is cooled together with the mold material so as to be solidified. Thereafter, the mold material is destroyed and a shaped article made of the metal is taken out. In such a manner, a desired shaped article can be produced by using the wax-like substance.

However, the so-called convenience of using of the wax-like substance, such as easiness in processing, dewaxing the wax-like substance, is closely connected to the physical properties of the wax-like substance. When the physical properties change subtly, the easiness in processing and dewaxing the wax-like substance changes greatly. In other words, in the case where the physical properties which are provided to the wax-like substance deviates from a certain range, namely, a proper range where a convenient use can be obtained, when a shaped article is produced by using the wax-like substance, there arises the following problems:

(1) in the case where viscosity of the wax-like substance is higher than a proper viscosity range, when a master model is produced by processing the wax-like substance, shavings and chips produced by the process are tacky. For this reason, the point of a chisel and the teeth of a saw, a file, etc. are liable to be clogged with shavings and chips. In other words, workability of the wax-like substance is deteriorated;

(2) in the case where a melting point of the wax-like substance is higher than a proper temperature range, when the wax-like substance (master model) is dewaxed from the mold material, the mold material needs to be heated at a higher temperature. For this reason, dewaxing becomes difficult. Furthermore, since the mold material is heated at a high temperature, a crack is liable to occur in the mold material. When the mold material is destroyed due to the occurrence of the crack, it becomes impossible to produce a shaped article;

(3) in the case where the hardness of the wax-like substance is, lower than the proper hardness range, the processed master model is liable to lose its shape. Furthermore, since the master model is liable to lose its shape, the surface of the master model cannot be polished. Here, in this case, in order to prevent the master model from losing its shape, the work environment should be arranged such that the temperature of the work envelope is kept uniform;

(4) in the case where the hardness of the wax-like substance is higher than the proper hardness range, the viscosity is liable to become lower than the proper viscosity range. For this reason, the workability of the wax-like substance is deteriorated.

As the conventional wax-like substance for use in the above-mentioned wax-mold casting method, for example, beeswax, paraffin wax, etc. are known. The paraffin wax is put on the market by, for example, Nippon Seiro Co., Ltd., Ferris Corporation (U.S.), etc.

However, as to the physical properties of the conventional wax-like substance (namely, the paraffin wax on the market), its rate of change is great with changes in temperature. Therefore, as to the conventional wax-like substance, its physical properties are liable to deviate from the proper range for use in, for example, winter and summer. In other words, from the view point of case in processing, dewaxing, etc., the use of the conventional wax-like substance is inconvenient.

In addition, the conventional wax-like substance changes in quality due to repetition of heating and cooling, and its physical properties change. Therefore, even though shavings, chips and dewaxed and collected wax-like substances are fused and are again solidified so as to form a block-like configuration, it cannot be reused because its physical properties have changed.

Writing implements for writing and drawing characters, pictures, lines, etc. on materials to be written on such as paper, include crayon, etc. Furthermore, writing implements for writing characters, pictures, lines, etc. on materials to be written on such as stone, asphalt, and concrete, include chalk, etc. The crayon and the chalk are formed so as to have a stick-like configuration.

However, crayon and chalk are liable to be worn out and broken because of their softness. Therefore, since they cannot be use for a long period, they are uneconomical. In addition, since the crayon and the chalk are soft, when they are held in hands, the hands are liable to be soiled. The color of the crayon is liable to run, and when the crayon is exposed to a high temperature (in summer), deformation and loss of shape may occur. Moreover, the crayon and the chalk have disadvantages, for example when the characters, pictures, lines, etc. written and drawn by the crayon and the chalk are rubbed by other materials to be written on or by a hand, they become smudged.

In addition, since the crayon and the chalk are formed so as to have a stick-like configuration, as they are worn down due to writing and drawing, the configuration of their tips becomes rounder. Therefore, when the characters, pictures, lines, etc. are made, the sizes of the characters and the pictures, or the thickness of the lines are difficult to adjust.

In other words, the use of the crayon and the chalk is inconvenient. Therefore, a writing implement capable of writing and drawing characters, pictures, lines, etc. on materials to be written on, such as paper, wood, stone, asphalt, concrete, metal or glass, namely, a marking material, is demanded.

SUMMARY OF THE INVENTION

It is a first object of the present invention to provide a wax-like substance which can be used repeatedly, has excellent workability and is easily dewaxed from a mold material, in other words, one which ensures convenient use.

In order to attain the first object, the wax-like substance of the present invention is characterized by including:

saturated chain hydrocarbon as a main component, wherein a weight ratio of carbon to hydrogen (C/H) is 5.839–6.018, a total weight % of the carbon and the hydrogen is 98.5%–100%, a number-average molecular weight (Mn) is $3.0 \times 10^3$–$1.0 \times 10^4$, a weight-average molecular weight (Mw) is $1.0 \times 10^4$–$5.0 \times 10^4$ and Mw/Mn is 1.0–5.0.

With the above construction, the wax-like substance does not change in quality and has excellent stability even if it is repeatedly heated at a low temperature of 100° C.–120° C. and cooled. Furthermore, physical properties of the wax-like substance, such as the melting point, viscosity, and hardness ensure excellent workability, and make the wax-like substance fall in a suitable range where the wax-like substance is easily dewaxed from a mold material (mold). In other words, the wax-like substance can be easily processed, and does not easily soften and lose its shape. This makes it possible to provide a wax-like substance which can be repeatedly used and, has excellent workability. In other words, it ensures convenient use for carving and casting.

In addition, in the case where the wax-like substance is used as a marking material, a marking material which ensures convenient use can be provided.

It is a second object of the present invention to provide a molding method using the wax-like substance.

In order to attain the second object, a molding method using the wax-like substance according to the present invention is characterized by comprising the steps of:

making a master model by processing the wax-like substance;

covering the master model with a mold material so as to dewax the master model;

pouring molten metal into the mold material which is a mold; and cooling the mold material where the molten metal has been poured so as to solidify it.

With the above method, desired molds, such as a decoration having a very fine pattern, an accessory having a complicated and three-dimensional configuration, and an industrial art object, can be suitably produced. In addition, only one shaped article can be produced from one master model. Therefore, the produced shaped article has a high value due to its limited supply.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) shows a step of covering a master model with a mold material; FIG. 1 (b) shows a step of dewaxing the master model by melting it and pouring it out from the mold material; FIG. 1(c) shows a step of pouring metal into the mold material; and FIG. 1(d) shows a step of taking out a shaped article by breaking the mold material.

DETAILED DESCRIPTION OF THE INVENTION

Figure 1A:
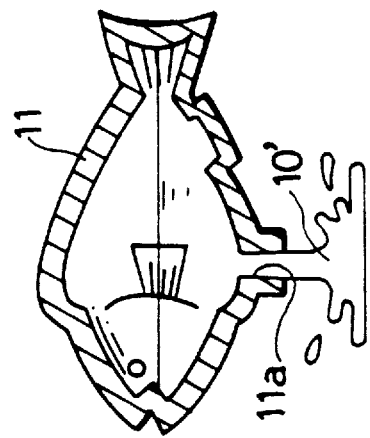
FIGS. 1(a) through 1(d) are explanatory drawings which explain a procedure for a molding method using a wax-like substance in one embodiment of the present invention.

Referring to FIGS. 1 through 4, the following description will discuss one embodiment of the present invention.

A wax-like substance of the present embodiment can be obtained by reacting, for example, synthetic resin, which is overheated-fused raw material, to pyrolysis. As the synthetic resin, polyolefin, such as non cross-linked, low cross-linked or high cross-linked polyethylene resin or polypropylene resin, or polystyrene resin, etc. can be used. However, the synthetic resin is not limited to this, if such a resin is capable of obtaining the wax-like substance by reacting it to pyrolysis. For example, the wax-like substance can be produced at a low cost from waste of the synthetic resin, such as polyethylene resin or polypropylene resin. A producing method of the wax-like substance will be mentioned later in detail.

Next, the following description will discuss the wax-like substance of the present embodiment suitably comparing it with the conventional wax-like substances.

First, physical properties, etc. of the wax-like substance will be described. Elementary analysis of the wax-like substance was carried out in the following manner. Moreover, a molecular weight and a molecular weight distribution of the wax-like substance were measured in the following manner. The physical properties of the wax-like substance were also measured. In other words, a melting point and a specific gravity of the wax-like substance as well as a flow test, a hardness test, a tension test and a bending test were carried out in the following manner. In order to compare the wax-like substrate with wax made by Nippon Seiro Co., Ltd. (hereinafter, referred to as the conventional article A) and wax made by Ferris Corporation (U.S.) (hereinafter, referred to as the conventional article B) which are the conventional wax-like substrates, physical properties of the conventional articles A and B were also measured. The obtained results are shown in Table 1.

Elementary Analysis

Each weight % (wt %) of carbon, hydrogen, nitrogen and sulfur, and each content ($\mu$g/g) of total chromium, cadmium and lead were measured. Each weight % of the carbon, hydrogen and nitrogen was measured from the C, H, N corder. After the fuel pipe-type silica tube oxgenating method burned the sulfur based upon JIS K 2541, the weight % of the sulfur was measured by using a nephelometry. Each content of total chromium, cadmium and lead was measured by using an atomic absorption method. Furthermore, each measurement was carried out provided that a laboratory temperature was 19° C.

Molecular Weight and Distribution in Molecular Weight

An average molecular weight in number (Mn) and an average molecular weight in weight (Mw) were measured by using a GPC method. The measuring conditions were as follows:

Column: AD80M/S

Mobile phase: o-dichlorobenzene

Detecting wavelength: IR (3.42 $\mu$m)

Temperature: 140° C.

Flow rate: 1.0 ml/min.

Sample concentration: 2.0 mg/ml

In addition, the measurement was carried out provided that the laboratory temperature was 22° C.

Melting point

A melting peak temperature (°C.) was measured based upon JIS K 7122 by using a DSC method. A testing machine made by Seiko Electronic Industry Corporation DSS-220C was used. The measuring condition was as follows:

Heating rate: 10° C./min.

In addition, the measurement was carried out provided that the laboratory temperature was 21° C.

Specific gravity

The specific gravity was measured based upon JIS K 7112 by using an underwater substitution method. The measurement was carried out provided that the laboratory temperature was 21° C.

Flow test

Viscosity (poise) and a melting start temperature (°C.) were measured based upon JIS K 7210 by using a flow tester. The viscosity was measured so as to obtain the values at 40° C., 60° C., 80° C. and 100° C. by a uniform temperature test. The measuring conditions were as follows:

Die diameter: 1 mm

Test load: 10 kgf–500 kgf

The melting start temperature was measured by a heating test. The measuring conditions were as follows:

Die diameter: 1 mm

Test load: 10 kgf

Heating rate: 3° C./min.

In addition, the measurement was carried out provided that the laboratory temperature was 21° C.

Hardness Test

The hardness (HDD) was measured based upon JIS K 7215. The measurement was carried out provided that the laboratory temperature was 21° C.

Tension Test

The tensile strength (kgf/cm$^2$) was measured based upon JIS K 7113. The measuring conditions were as follows:

Test piece: No. 1 type

Test speed: 50 mm/min.

In addition, the measurement was carried out provided that the laboratory temperature was 21° C.

Bending Test

The bending strength (kgf/mm$^2$), the bending elastic modulus (kgf/mm$^2$), the indentation capacity (mm) until destruction and the indentation capacity (mm) until yielding were measured. The measuring conditions were as follows:

Test piece: 80 mm×10 mm×2 (t)mm

Test speed: 1 mm/min.

Distance between supporting point: 30 mm

In addition, the measurement was carried out provided that the laboratory temperature was 21° C.

TABLE 1

| | | Wax-like substance | Conventional article A | Conventional article B |
|---|---|---|---|---|
| Elementary analysis | Carbon (wt %) | 84.5 | (Unmeasured) | 84.4 |
| | Hydrogen | 14.3 | | 13.5 |
| | Nitrogen | 0.2 | | 0.3 |
| | Sulfur (μg/g) | below 0.02 Detection limit(10) or less | | below 0.01 Detection limit(10) or less |
| | Total chromium | Detection limit(2) or less | | Detection limit(2) or less |
| | Cadmium | | | |
| | Lead | Detection limit (5) or less | | Detection limit(5) or less |
| Molecular weight and distribution in molecular weight | Number-average molecular weight (Mn) | 6.1 × 10$^3$ | 1.9 × 10$^3$ | 8.0 × 10$^3$ |
| | weight-average molecular weight (Mw) | 2.8 × 10$^4$ | 2.1 × 10$^3$ | 4.7 × 10$^4$ |
| | Mw/Mn | 4.5 | 1.1 | 5.9 |
| Melting point | Melting peak temperature (°C.) | 109 | 50 | 106 |
| Specific gravity | | 0.931 | 0.915 | 0.927 |
| Flow test | Viscosity (poise) 40 °C. | Impossible to measure | 4.2 × 10$^5$ | Impossible to measure |
| | 60 | 4.3 × 10$^6$ | 93 | 3.4 × 10$^6$ |
| | 80 | 5.3 × 10$^4$ | 7.2 | 2.2 × 10$^5$ |
| | 100 | 3.5 × 10$^3$ | Impossible to measure | 5.4 × 10$^3$ |
| | Melting start (°C.) temperature | 97 | 46 | 98 |
| Hardness test | Hardness (HDD) | 51 | 23 | 48 |
| Tension test | Tensile strength (kgf/cm$^2$) | 92 | 19 | 79 |
| Bending test | Bending strength (kgf/mm$^2$) | 0.74 | 0.27 | 1.03 |
| | Bending elastic modulus (kgf/mm$^2$) | 52 | 23 | 31 |
| | Indentation capacity until destruction (mm) | 0.82 | Undestroyed | Undestroyed |
| | Indentation capacity until yielding (mm) | Destroyed at 0.82 | 1.8 | 5.12 |

The above measurement results will be examined as follows. In other words, the physical properties of the wax-like substance according to the present embodiment are compared with those of the conventional articles A and B so that a difference between the respective physical properties is examined.

First, the results of the elementary analysis is considered. A molecular formula of a saturated chain hydrocarbon (paraffinic hydrocarbon) is represented by $C_nH_{2n+2}$. Since an atomic weight of the carbon is 12.011, and an atomic weight of the hydrogen is 1.00794, a weight ratio (C/H) of the carbon to the hydrogen is approximately 5.958.

A weight ratio of the wax-like substance is 5.909. A total weight (%) of the carbon and the hydrogen is 98.8%.

Namely, it is found that a main component of the wax-like substance is constituted of saturated chain hydrocarbon.

On the contrary, a weight ratio of the conventional article B is 6.252. Such a large weight ratio shows that the weight of hydrogen is light to the weight of the carbon. Further, a total weight (%) of the carbon and hydrogen is 97.9%. Namely, it is considered that the conventional article B contains not only the saturated chain hydrocarbon but also chain hydrocarbon as impurity including substituent, such as carbonyl group, carboxyl group or hydroxyl group which contain oxygen. Moreover, there is a possibility that unsaturated hydrocarbon gets mixed with the conventional article B from a standpoint of its weight ratio.

Next, the results of the molecular weight and the the molecular weight distribution will be considered. As to the wax-like substance, the number-average molecular weight (Mn) is $6.1 \times 10^3$, the weight-average molecular weight (Mw) is $2.8 \times 10^4$, and Mw/Mn is 4.5. Further, a peak of a distribution curve of the molecular weight (not shown) leans towards a light molecular weight side. On the contrary, as to the conventional article A, Mn is $1.9 \times 10^3$ and Mw is $2.1 \times 10^3$. In other words, the molecular weight of the conventional article A is apparently lighter than that of the wax-like substrate. As to the conventional article B, Mn is $8.0 \times 10^3$ and Mw is $4.7 \times 10^4$, so it has the substantially same molecular weight as the wax-like substance. However, since Mw/Mn is 5.9, the molecular weight distribution is slightly wider than that of the wax-like substance.

As to the wax-like substance (or the conventional articles A and B), if its composition, molecular weight and molecular weight distribution are different, its physical properties become different. Moreover, the wax-like substance is a mixture of various types of saturated chain hydrocarbon, and its physical properties are represented by comprehensive results of a complicated crystal structure of the hydrocarbon which is a composition. Therefore, the difference between physical properties of the wax-like substance and those of the conventional articles A and B seems to arise from slight differences in the composition, the molecular weight and the molecular weight distribution.

Next, the measuring results of the melting point will be considered. The melting peak temperature of the wax-like substance is 109° C. On the contrary, the melting peak temperature of the conventional article A is 50° C. because of its light molecular weight. In other words, when temperature or room temperature is high, for example, in summer, a master model made by processing the conventional article A is liable to lose its shape. For this reason, in the case where the master model is made by using the conventional article A, a work environment should be arranged such that a temperature of the work envelope is kept uniform.

In addition, the wax-like substance was odorless when it melted. On the contrary, the conventional article B emitted an offensive odor when it was melted. This makes it clear that the conventional article B contains not only the saturated chain hydrocarbon but also the above-mentioned impurity.

Next, the results of the flow test will be considered. As to the wax-like substance, the viscosity is $4.3 \times 10^6$ poise at 60° C., $5.3 \times 10^4$ poise at 80° C. and $3.5 \times 10^3$ poise at 100° C., and the melting start temperature is 97° C. (the viscosity at 40° C. could not be measured because the wax-like substance was not melted at all).

On the contrary, since the melting peak temperature of the conventional article A is low, the viscosity is $4.2 \times 10^5$ poise at 40° C., 93 at 60° C. and 7.2 at 80° C., and the melting start temperature is 46° C. (the viscosity at 100° C. could not be measured by using the above measuring method because the conventional article A was completely melted). In other words, as mentioned above, it is found that the master model made by processing the conventional article A is liable to lose its shape. As to the conventional article B, the viscosity is $3.4 \times 10^6$ poise at 60° C., $2.2 \times 10^5$ poise at 80° C. and $5.4 \times 10^3$ poise at 100° C., and the melting start temperature is 98° C. (the viscosity at 40° C. could not be measured because the conventional article B was not melted at all).

In general, in the case where the wax-like substance (or the conventional articles A and B) is processed by means of processing tools, such as a chisel, a cutter, a saw or a file, a contact point of the wax-like substance with the processing tools is heated by a friction heat. For this reason, for example, in the case where the viscosity in the proximity of 80° C. is high, when a master model is made by processing the wax-like substance, shavings and chips produced by processing are heated by the friction heat and are tackey. Then they adheres to the processing tools. In other words, the point of the chisel or the teeth of the saw and file are liable to be clogged with the shavings and chips, thereby decreasing the workability of the wax-like substance. Whereas the viscosity at 80° C. of the wax-like substance is $5.3 \times 10^4$ poise, that of the conventional article B is $2.2 \times 10^5$ poise which is high. This makes it clear that the wax-like substance is easier to process than the conventional article B. Here, the reason for the lower viscosity at 80° C. of the wax-like substance than that of the conventional article B is that the peak of the distribution curve of the molecular weight of the wax-like substance leans towards the light molecular weight side.

In addition, the viscosity at 100° C. of the wax-like substance is lower than that of the conventional article B. In other words, the wax-like substance flows more easily to at 100° C. than the conventional article B. This makes it clear that the wax-like substance is easier to dewax from a mold material which is a mold than the conventional article B.

Next, the results of the hardness test will be considered. The hardness of the wax-like substance is 51 HDD, whereas the hardness of the conventional article B is 48 HDD. This makes it clear that the master model of the wax-like substance is harder to lose its shape than that of the conventional article B.

Next, the results of the tension test will be considered. The tensile strength of the wax-like substance is 92 kgf/cm$^2$, whereas the tensile strength of the conventional article B is 79 kgf/cm$^2$.

When the master model is made by processing the wax-like substance (or the conventional articles A and B), if the tensile strength is low, the processed portion is not finished satisfactorily because of, for example, the occurrence of a fine crack. In other words, the master model is not finished so as to have a desired configuration. The tensile strength of the wax-like substance is greater than that of the conventional article B. This makes it clear that the wax-like substance can make the more satisfactory master model than the conventional article B.

Next, the results of the bending test will be considered. The bending strength of the wax-like substance is 0.74 kgf/mm$^2$ and the bending elastic modulus is 52 kgf/mm$^2$. Meanwhile, the bending strength of the conventional article B is 1.03 kgf/mm$^2$ and the bending elastic modulus is 31 kgf/mm$^2$. Furthermore, the indentation capacity until the destruction is 0.82 mm (the indentation capacity until yielding could not be measured because the test piece was destroyed at the point of 0.82 mm). Meanwhile, the indentation capacity until yielding of the conventional article B is 5.12 mm (the indentation capacity until the destruction could not be measured because the test piece was not destroyed).

In the case where the master model is made by processing the wax-like substance (or the conventional articles A and B), if the bending strength is large, for example, when the shaving is scraped off from the wax-like substance, the processed portion is not finished satisfactorily such that a bonding portion of the shaving and the wax-like substance is stretched. Moreover, if the bending elastic modulus is small, when the wax-like substance is cut by a chisel, a cutter, etc., the shaving is broken into pieces around the point of the chisel or the cutter, and the processed portion is not finished satisfactorily. In other words, the master model is not finished to have a desired configuration. The bending strength of the wax-like substance is smaller than that of the conventional article B. Further, the bending elastic modulus of the wax-like substance is larger than that of the conventional article B. This makes it clear that the wax-like substance can make the master model more satisfactorily than the conventional article B.

In addition, original molds were made by using the wax-like substance, the conventional articles A and B, and a difference in their workability, namely, each convenience of use was compared. As a result, a process such as carving could be easily applied to the wax-like substance. On the contrary, since shavings adhered to the chisel, it took time and effort to apply the process such as curving to the conventional article B. Furthermore, the master model made by processing the wax-like substance did not lose its shape. On the contrary, the master model made by processing the conventional article A lost its shape. Here, the wax-like substance is harder but is not more fragile than the conventional article B, so any inconvenience arose when the process was applied.

As is apparent from the above-mentioned results, the wax-like substance is not easily softened and does not easily lose its shape during and after processing such as carving. For this reason, even laymen can easily apply a carving process, etc. to the wax-like substance having a block-like configuration, etc. using the processing tools for woodwork such as a chisel. Since the wax-like substance is easy to handle for laymen, it is applicable to, for example, carving, casting, etc., namely, producing shaped articles (namely, molding method).

A difference in the convenience in use between the wax-like substance and the conventional articles A and B seems to occur due to a slight difference in each of the physical properties. In other words, the difference in the convenience in use is assumed to arise mainly from each difference in a weight ratio of the carbon to the hydrogen, a total weight % of the carbon and the hydrogen, the molecular weight and the molecular weight distribution.

Therefore, the inventor wholeheartedly examined a range of each physical property which provided convenient use in the case where the wax-like substance was used for carving and casting, for example. As a result, it is not clear which of the physical properties affects the ease of processing the wax-like substance at the time of making the master model. However, it becomes clear that if each physical property is within the range which will be described later, the workability of the wax-like substance is as desired.

In other words, it is favorable that the weight ratio of the carbon to the hydrogen (C/H) is 5.839–6.018, and that the total weight % of the carbon and the hydrogen is 98.5%–100%. It is favorable that the number-average molecular weight (Mn) is $3.0 \times 10^3$–$1.0 \times 10^4$, the weight-average molecular weight (Mw) is $1.0 \times 10^4$–$5.0 \times 10^4$, and that Mw/Mn is 1.0–5.0. It is desirable that the melting peak temperature is 100° C.–120° C. It is preferable that the viscosity is $2.0 \times 10^6$ poise-$8.0 \times 10^6$ poise at 60° C., $2.0 \times 10^4$ poise1-$1.0 \times 10^5$ poise at 80° C. and $1.0 \times 10^3$ poise-$7.0 \times 10^3$ poise at 100° C., and that the melting start temperature is 90° C.–110° C. It is preferable that the hardness is 40 HDD–60 HDD, and that the tensile strength is 80 kgf/cm²–100 kgf/cm². It is preferable that the bending strength is 0.6 kgf/mm²–0.9 kgf/mm², and that the bending elastic modulus is 40 kgf/mm²–60 kgf/mm². It is preferable that the indentation capacity until destruction is 0.7 mm–0.9 mm. Furthermore, it is preferable that an elasticity and a restoring force are hardly included. Here, if each physical property is not within the above-mentioned range, the workability of the wax-like substance is deteriorated.

As mentioned above, the main composition of the wax-like substance according the present embodiment is the saturated chain hydrocarbon. The weight ratio of the carbon to the hydrogen (C/H) is approximately 5.958, and the total weight % of the carbon and the hydrogen is 98.8%. For this reason, even if the wax-like substance is heated to, for example, a low temperature of 100° C.–120° C. and is cooled, it does not change in quality so its stability is excellent. Moreover, the number-average molecular weight (Mn) is $6.1 \times 10^3$, the weight-average molecular weight (Mw) is $2.8 \times 10^4$, and Mw/Mn is 4.5. Therefore, the physical properties of the wax-like substance, such as the melting point, viscosity, the hardness, ensures the excellent workability, and fall in the proper range where the dewaxing from the mold substrate (mold) is easy. In other words, a process is easily applied to the wax-like substrate, and the wax-like substrate is not easily softened and does not easily lose its shape.

Therefore, in the case of using it for carving and casting, for example, the wax-like substance can be repeatedly used, and has excellent workability. Moreover, the wax-like substance provides easy dewaxing from the mold material, in other words, it provides convenient use.

The following will discuss the procedure for a molding method of molding articles (namely, a wax molding method) using the wax-like substance with reference to FIG. 1.

First, the wax-like substance having a block-like configuration, etc. whose size corresponds to a size of a mold to be made is processed so as to have a desired configuration, namely the configuration of the mold, by using processing tools, such as a chisel, cutter, saw or file. At this time, after an outline of the mold is drawn on the wax-like substance, the wax-like substance may be processed, or may be immediately processed without drawing the outline of the mold. Furthermore, a surface of the wax-like substance may be ground by using sandpaper, cloth, etc. as necessary. When the surface of the wax-like substance is ground, a surface of the mold is finished smoothly. This shortens the time to grind the mold constituted of metal, and also decreases efforts.

Here, since a master model mad e by the wax-like substance does not lost its shape, the work environment does not have to be controlled (for example, the temperature in the workshop does not need to be uniform). Therefore, the workshop where the wax-like substance is processed is not particularly limited. Furthermore, the con figuration of the wax-like substance before processing is not limited to the above-mentioned block-like configuration. For example, in the case where a shaped article to be produced is tableware, such as a plate, a cup, the wax-like substance may have a similar configuration to the plate or the cup.

Next, as shown in FIG. 1(a), after a casting opening (not shown) is provided to a suitable position on a master model 10 finished by the above process, the master model 10 is covered with a refractory such as slurry of gypsum, etc. Thereafter, the gypsum is hardened so as to remove the casting opening. In other words, the master model 10 is covered with a heat-resistant mold material 11. Here, a runner 11a for dewaxing and casting is formed in the a position where the casting opening was provided in the mold material 11.

Figure 1B:
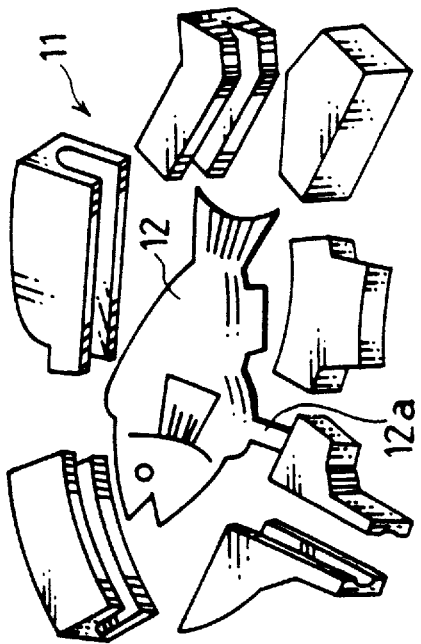

Next, as shown in FIG. 1(b), the mold material 11 is heated externally so that the wax-like substance which is the master model 10 is melted. Then, the melted wax-like substance 10' is poured out from the runner 11a (dewax). Here, when the mold material 11 is heated, an autoclave, etc. is used. Moreover, the heating temperature of 100° C.–120° C. is sufficient. As a result, there is no possibility that a crack occurs on the mold material 11 during the dewaxing work, so the dewaxing work is easy.

Thereafter, the mold material 11 is burned by an electric furnace, a gas furnace, etc., and the wax-like substance 10', which remains in the mold material 11, is completely vaporized. As a result, a cavity is created inside the mold material 11. Next, the mold material 11 which became the mold is gradually cooled until the mold has a suitable temperature for casting.

Figure 1C:
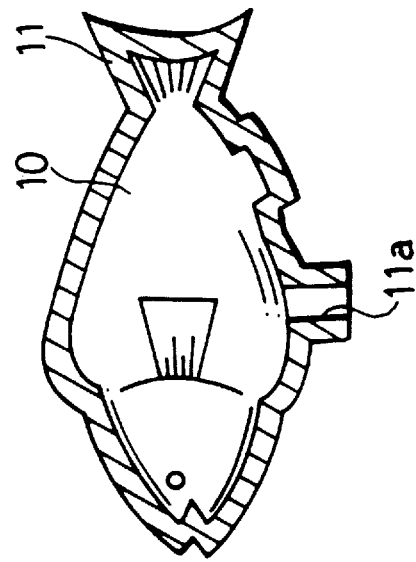
Figure 1D:
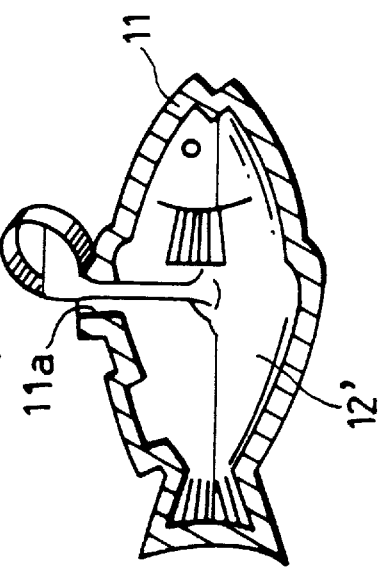

Successively as shown in FIG. 1(c), molten metal 12' which becomes a shaped article 12 (FIG. 1(d)) is poured through the runner 11a into the mold material 11. Thereafter, the molten metal 12' is cooled together with the mold material 11 so as to be hardened. The metal is not particularly limited, so desired metal, such as platinum, gold, silver, copper, aluminum, and alloys of these, or stainless steel, can be used. Further, centrifugal casting, vacuum casting, pressure casting, etc. are applicable to the casting method, but the casting method is not limited to them.

Next, as shown in FIG. 1(d), the mold material 11 is destroyed by a hammer, a mallet, etc. so that the shaped article 12 is taken out. A burr section 12a may be formed on a portion of the shaped article 12 where the runner 11a was formed on the mold material 11. In this case, the burr section 12a which is constituted of excess metal can be shaved off by using a file, etc.

As mentioned above, the molding method using the wax-like substance of the present embodiment processes the wax-like substance and makes the master model 10 so as to cover the master model 10 with the mold material 11. Thereafter, this method dewaxes the master model 10, and pours the molten metal 12' into the mold material 11 which becomes the mold. Then, the molten metal 12' is cooled and is solidified so that the shaped article 12 is produced.

As a result, desired shaped articles, such as a decoration having a very fine pattern, an accessory having a complicated and three-dimensional configuration, or an industrial art object, can be suitably produced by using the wax-like substance. Concretely, an ornament, a nameplate, tableware, a seal, a brouch, a ring, a pendant, a key ring, an accessory case, a statue of Buddha, etc. are given as the shaped articles, but the shaped articles are not limited to them. Further, only one shaped article can be produced from one master model. Therefore, produced shaped articles have high value. Here, since the master model 10 does not lose its shape, it may be possible to use the master model 10 itself as a decoration, etc.

As mentioned above, the wax-like substance of the present embodiment is suitable for use in the so-called wax-model casting method, but it can also be used for the so-called lost wax method. In this case, templating of the master model 10 is carried out by using, for example silicone rubber, etc. so that shaped articles having uniform configuration can be mass-produced by using the rubber mold.

In addition even if the wax-like substance is repeatedly heated at a low temperature of 100° C.–120° C. and cooled, its physical properties do not change. For this reason, the wax-like substance can be reused by carrying out the following process: (1) collecting and melting the shavings, chips and dewaxed wax-like substance; (2) pouring them into a core-box; and (3) hardening them so as to have a block-like configuration, etc. of a predetermined size. Therefore, economy in the wax-like substance is improved. In the case where the wax-like substance fails to be processed, the original block-like configuration, etc. can be again obtained by pouring the melted wax-like substance into the core-box. Therefore, in the molding method by using the wax-like substance, the wax-like substance can be reprocessed many times until a desired master model is completed.

In the case where shaped articles to be produced are tableware such as plates, cups, for example, the wax-like substance may be hardened by means of a core-box whose configuration is close to that of the plates or cups. As a result, since the wax-like substance can attain a configuration close to that of the plates or cups, the processing time can be shortened.

The material of the core-box is not particularly limited if its heat-resistance temperature is higher than the melting temperature of the wax-like substance. Since the wax-like substance does not adhere to the core-box, departing of the wax-like substance from the core-box is excellent. However, since the conventional article B easily adheres to the core-box, departing of the conventional article B is inadequate.

Next, the following will discuss a producing method for the wax-like substance giving one example.

Figure 2:
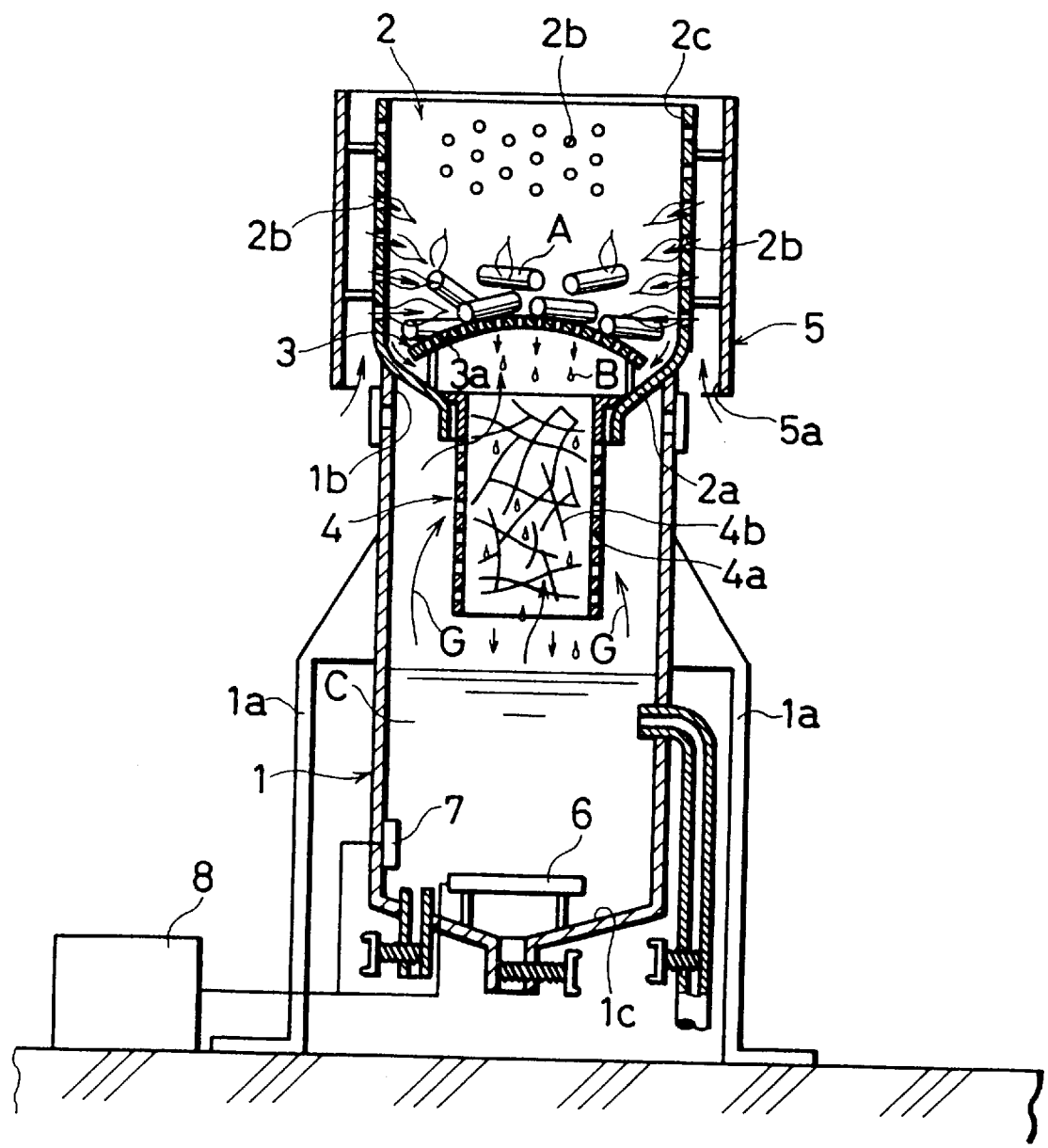
FIG. 2 is a schematic cross section which shows one embodiment of a producing apparatus for the wax-like substance.

As shown in FIG. 2, a producing apparatus for the wax-like substance has a reservoir tank 1 for receiving a wax-like substance C. The reservoir tank 1 is supported by supporting legs 1a . . . A cylinder-type combustion basket 2 is integrally installed at upper end openings 1b of the reservoir tank 1. Innumerable air suction holes 2b . . . are dug on a sidewall of the combustion basket 2. Further, an upper end opening 2c of the combustion basket 2 is in a bleeding state. A raw material plate 3 which has a convex surface is installed in the lower part of the combustion basket 2 such that it blocks a lower end opening 2a of the combustion basket 2 from above. A lot of plate holes 3a . . . are dug on the raw material plate 3. Raw material A (mentioned later) is stored on the raw material plate 3.

In addition, a box-like catalyst tank 4 which is blocked is installed in the lower part of the combustion basket 2 such that it blocks the lower end opening 2a from the bottom. A whole wall of the catalyst tank 4 has a net-like section 4a. A catalyst which speeds up a pyrolysis reaction of melting material B (mentioned later), namely, a line-like catalyst 4b constituted of metal such as platinum, copper is filled into the catalyst tank 4. The melting material B passes through the line-like catalyst 4b.

A cylinder-like air balancer 5 is installed on the periphery of the combustion basket 2 so that air quantity to be supplied to the combustion basket 2 is controlled. The air balancer 5 is placed at a predetermined interval from the combustion basket 2. Moreover, an opening 5a for introducing air is provided on the lower part of the air balancer 5. The upper part of the air balancer 5 is in a bleeding state.

In addition, a plurality of communicating tubes, not shown, are installed between the reservoir tank 1 and the combustion basket 2. These communicating tubes are connected to a pump (not shown) for feeding gas generated in the reservoir tank 1 to the combustion basket 2.

A pipe-like heater 6 is installed at the bottom of the reservoir tank 1 so as to raise the temperature of the wax-like substance C. The heater 6 carries out electric heating or high-frequency heating on the wax-like substance C. Further, a temperature sensor 7 such as a bimetal, a thermocouple, for detecting the temperature of the wax-like substance C is installed in the reservoir tank 1. An ON/OFF control or a proportional control operates on the heater 6 by a control means 8. The control means 8 controls the heater 6 in accordance with a signal from the temperature sensor 7 so that the wax-like substance C has a prescribed temperature.

Next, the following will discuss a producing method of the wax-like substance C using the producing apparatus having the above-mentioned arrangement.

First, a predetermined amount of raw material which is composed of synthetic resin as a raw material, and fuel as high cross-linked polyethylene resin and polypropylene resin is fed into the combustion basket 2. Next, the fuel is set on fire and burns so that the synthetic resin is melted, and some of the synthetic resin is pyrolytically decomposed so that the synthetic resin is liquefied by making it have low molecule. Then melting material B which is a mixture of these drops from the plate holes 3a . . . passes through a linear catalyst 4b of the catalyst tank 4 so as to drop in the reservoir tank 1.

At this time, oxygen in the catalyst tank 4 and the reservoir tank 1 reacts on the melting material B and is promptly consumed. For this reason, the catalyst tank 4 and the reservoir tank 1 is short of oxygen. This causes resin on which thermal cracking is not carried out or is insufficiently carried out to be pyrolytically decomposed in a state where the catalyst tank 4 is short of oxygen and to obtain low molecule. As a result, the resin becomes wax-like substance C. The wax-like substance C is reserved in the reservoir tank 1 in a melted state.

The wax-like substance C in a melted state is heated by the heater 6 and is controlled by the temperature sensor 7 and the control means 8 so that its melting temperature is kept at a predetermined temperature. Therefore, since the wax-like substance C is short of oxygen and the melting temperature is stable, rich gas G such as flammable ethylene gas is stably generated by vaporizing some of the wax-like substance C. Here, the melting temperature of the wax-like substance C may be set so as to become approximately 600° C.

The rich gas G whose amount of generation is controlled goes up through the catalyst tank 4 and the raw material plate 3 or goes through the communicating tube and the pump, not shown, so as to reach the combustion basket 2 where the raw material A is burned. Then, the rich gas G is burned by being mixed with air fed from each air suction hole 2b . . . For this reason, the temperature in the combustion basket 2 is controlled so as to become a predetermined temperature. This maintains melting and decomposition of the raw material A which is successively fed to the combustion basket 2.

Here, an interior temperature of the combustion basket 2 is desired to be 1100° C. Furthermore, the rich gas G as well as fine-particles of carbon are generated from the wax-like substance C, but the generated fine-particle carbon is completely burned in the combustion basket 2. For this reason, carbon soot does not adhere to the combustion basket 2. Therefore, the carbon soot does not get mixed with the wax-like substance C.

The wax-like substance of the present embodiment is produced in the above-mentioned manner. Of course, the producing apparatus and the producing method of the wax-like substance are not limited to those illustrated above. In other words, the wax-like substance of the present embodiment is not limited to products which are produced by the above-illustrated method. Namely, as mentioned above, in the case of using for carving and casting, the wax-like substance may be produced in any manner, as long as it can be used repeatedly, its workability is excellent, and dewaxing from the mold material is easy, namely, the wax-like substance has an effect of convenient use.

In addition, the wax-like substance of the present embodiment can be used for carving and casting, and can be used as a marking material which is capable of writing and drawing characters, pictures, lines, etc. on various materials to be written on. The following will discuss a marking material utilizing the wax-like substance.

The marking material can be produced by mixing the wax-like substance with pigment in a predetermined manner. As to the method for mixing the wax-like substance with the pigment, for example, after the wax-like substance is melted and the pigment is added to the wax-like substance which is in a melting state, they may be mixed up by a stirring or they may be mixed up by kneading the wax-like substance and the pigment by means of a kneading machine. Here, the mixing method is not limited to the above illustrated methods.

Figure 3:
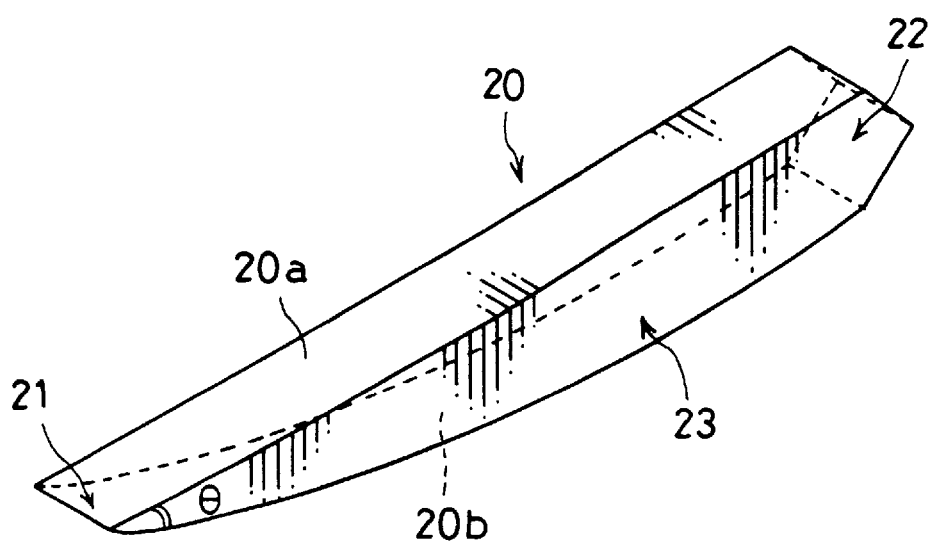
FIG. 3 is a perspective view of a marking material made of the wax-like substance.
Figure 4:
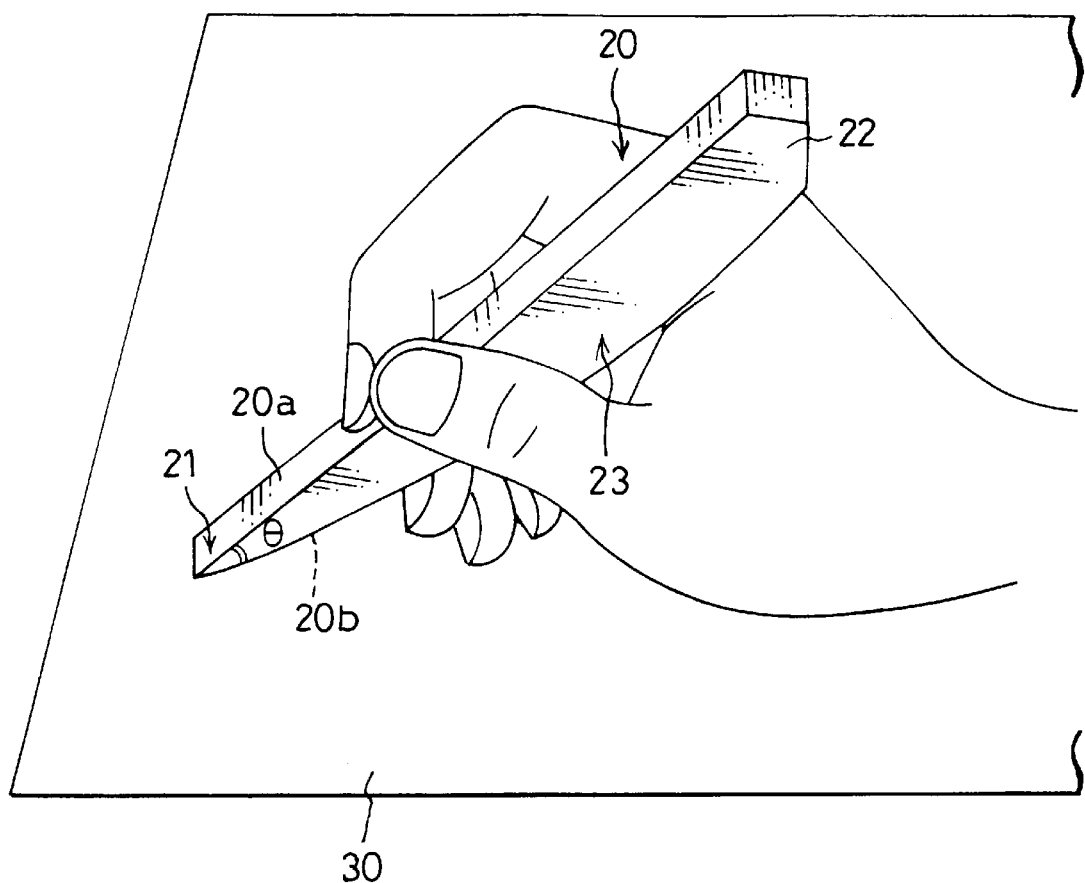
FIG. 4 is an explanatory drawing which schematically shows a state of use of the marking material.

As shown in FIGS. 3 and 4, the marking material 20 is formed so as to have an approximate wedge-configuration. In other words, a top surface 20a of the marking material 20 is substantially flat and an undersurface 20b is curved so that a trailing edge 22 becomes thicker than a leading edge 21 which should touch with a material 30 to be written on. The leading edge 21 of the marking material 20 is formed flat so that an angle θ formed where the top surface 20a crosses the undersurface 20b becomes 10°–30°, preferably 15°–25°, and more preferably, about 20°.

The trailing edge 22 of the marking material 20 is formed so as to have a configuration that characters, pictures, lines, etc. are easy to write and draw on the material 30 to be written on, namely, the marking material (20) is easy to hold for an operator. A hole which a string, etc. is passed through may be formed on the trailing edge 22 so that the marking material 20 is conveniently carried, kept, etc. Moreover, characters such as names of colors, products, etc. may be carved in the trailing edge 22 or a center 23. Further, in the case where the marking material 20 is mainly used by children, pictures of animals, etc. may be carved in the trailing edge 22 or the center 23. Here, the method for forming the marking material 20 so as to have the above configuration is not particularly limited.

Paper, wood, stone, asphalt, concrete, metal, glass, etc. can be used as the material 30 to be written on, but the material to be written on is not limited to these. In other words, the marking material 20 is capable of writing and drawing characters, pictures, lines, etc. on the above illustrated materials.

Inorganic pigment composed of metallic salt, etc. and organic pigment such as lake of dye can be used for the marking material 20. Any pigment can be used as long as it does not react to the wax-like substance, is insoluble in solvents such as water, alcohol, and is harmless material which presents predetermined colors vividly. Furthermore, any pigment is applicable as long as it has excellent heat resistance, light resistance, weather resistance and dispersibility against the wax-like substance, and does not have migration (so-called color migration and removal of color).

A mixing ratio of the wax-like substrate to the pigment, namely, a content of the pigment in the marking material 20 may be set considering a coloring condition of the pigment on the material 30 to be written on, ease of writing and drawing by means of the marking material 20, etc. The content of the pigment in the marking material 20 is preferably, for example, approximately 40 wt %–60 wt %, especially 50 wt %. Here, the content of the pigment is not limited to the above wt %.

The physical properties of the wax-like substance, ch are suitable for the marking material 20, are shown in Table 2.

TABLE 2

| | | Wax-like substance |
|---|---|---|
| Elementary analysis | Carbon (wt %) | 84.5 |
| | Hydrogen | 14.3 |
| | Nitrogen | 0.2 |
| | Sulfur | below 0.02 |
| | Total chromium ($\mu$g/g) | Detection limit (10) or less |
| | Cadmium | Detection limit (2) or less |
| | Lead | Detection limit (5) or less |
| Molecular weight and distribution in molecular weight | Number-average molecular weight (Mn) | $6.5 \times 10^3$ |
| | Weight-average molecular weight (Mw) | $2.2 \times 10^4$ |
| | Mw/Mn | 3.3 |
| Melting point | Melting peak temperature(°C.) | 108 |
| Specific gravity | | 0.935 |
| Flow test | Viscosity (poise) 40° C. | Impossible to measure |
| | 60 | $6.6 \times 10^6$ |
| | 80 | $2.3 \times 10^4$ |
| | 100 | $3.0 \times 10^3$ |
| | Melting star temperature(°C.) | 97 |
| Hardness test | Hardness (HDD) | 48 |
| Tension test | Tensile strength (kgf/cm$^2$) | 66 |
| Bending test | Bending strength (kgf/mm$^2$) | 0.96 |
| | Bending elastic modulus (kgf/mm$^2$) | 46 |
| | Indentation capacity until destruction (mm) | 1.85 |
| | Indentation capacity until yielding (mm) | Destroyed at 1.85 |

The following has been found from the measuring results.

It is found from the results of the melting point, flow and hardness tests that if the marking material 20 is exposed to high temperature (for example, in summer), deformation and loss of shape do not occur. Furthermore, the marking material 20 does not soil hands because of its moderate hardness, and color does not fade.

Next, it is found from the results of the tension and bending tests that if various stresses, such as compressive stress and, tensile stress, which are produced when the leading edge 21 is pressed against the material 30 to be written on , are applied to the marking material 20, a minute crack does not occur on the surface. Furthermore, the marking material 20 ensures excellent smoothness when characters, pictures, lines, etc. are written and drawn. Moreover, the marking material 20 resists wear and breakage because of its moderate hardness. Here, since the wax-like substance is hard but not brittle, inconvenience does not occur when the marking material 20 is processed.

As is apparent from the above results, the marking material 20 using the wax-like substance ensures convenient use. Here, the wax-like substance is harmless.

Next, the inventor of the present invention wholeheartedly examined a range of each physical property of the wax-like substance which provides convenient use. As a result, it is not clear which of the physical properties greatly affects the convenience of its use, but it is found out that the marking material 20 provides convenient use as long as each physical property of the wax-like substance falls in the following range.

In other words, the viscosity is preferably $3.0 \times 10^6$ poise-$1.2 \times 10^7$ poise at 60° C., $1.0 \times 10^4$ poise-$5.0 \times 10^4$ poise at 80° C. and $1.3 \times 10^3$ poise-$6.0 \times 10^3$ poise at 100° C. The tensile strength is preferably 55 kgf/cm$^2$–75 kgf/cm$^2$. The bending strength is preferably 0.8 kgf/mm$^2$–1.2 kgf/mm$^2$ and the bending elastic modulus is 35 kgf/mm$^2$–55 kgf/mm$^2$. The indentation capacity until destruction is preferably 1.7 mm –1.9 mm. Furthermore, the other physical properties preferably fall in the above-mentioned range. Here, if each physical property of the wax-like substance does not fall in the above range, the marking material 20 provides inconvenient use.

As mentioned above, the marking material 20 constituted by mixing the wax-like substance with the pigment does not change in quality and has excellent stability. Furthermore, the physical properties of the wax-like substance, such as the melting point, viscosity, and hardness, ensure excellent stability, and the wax-like substance falls in a predetermined range suitable for using it as the marking material 20, thereby providing the marking material 20 which ensures convenient use.

Therefore, the marking material 20 is capable of writing and drawing characters, pictures, lines, etc. on the material 30 to be written on, such as paper, wood, stone, asphalt, concrete, metal, or glass, thereby providing smooth sliding during writing and drawing. Moreover, the marking material 20 is harmless, does not soil hands because of its moderate hardness, and so-called removal of color does not occur. Further, even if the characters, pictures, lines, etc. written and drawn on the material 30 to be written on by the marking material 20 are rubbed by another material or by hands, they are not smudged, and do not spread when they get wet. Therefore, the characters, pictures, lines, etc. stay in an easy-to-see state.

In addition, since the marking material 20 is difficult to wear and break because of its moderate hardness, it can be used for a long period and is economical. Furthermore, even if the marking material 20 is exposed to high temperature (for example, in summer), deformation and loss of shape do not occur.

In addition, the marking material 20 is formed so as to have a wedge-shaped configuration and so that an angle θ which is formed at the leading edge 21 contacting with the material 30 to be written on where the top surface 20_a_ and the undersurface 20_b_ cross each other, becomes 10°–30°.

This makes it possible that characters, pictures, lines, etc. are written and drawn on the material 30 to be written on by using the marking material 20, and does not requires much force during writing and drawing. Furthermore, the marking material 20 is gradually worn out from the leading edge 21 due to writing, but the configuration and the angle θ of the leading edge 21 are substantially kept uniform. For this reason, it is easy to adjust a size of characters, pictures, etc. and a thickness of lines, etc. when the characters, pictures, lines, etc. are written and drawn by the marking material 20.

Here, in the case where a size of characters, pictures, etc. which are written and drawn, and a thickness of lines, etc. are desired to be decreased, the marking material 20 may be held so that the undersurface 20b faces upward and the top surface 20a faces downward instead of of holding the marking material 20 as shown in FIG. 4. In other words, the marking material 20 as may be held down side up. Furthermore, where an increase is desired in the size of characters, pictures, etc. and in the thickness of lines, etc., which are written and drawn, the trailing edge 22 may be used instead of the leading edge 21.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A substance for use in producing shaped articles for molding and as a durable marking composition, the substance comprising:

a saturated chain hydrocarbon which is a main component, said saturated chain hydrocarbon having a weight ratio of carbon to hydrogen of 5.839–6.018, a total weight % of the carbon and the hydrogen of 98.5%–100%, a number-average molecular weight of $3.0 \times 10^3$–$1.0 \times 10^4$, a weight-average molecular weight of $1.0 \times 10^4$–$5.0 \times 10^4$, a melting start temperature of 90° C. to 110° C., and the ratio of weight average molecular weight to number average molecular weight is 1.0–5.0.

2. The substance as defined in claim 1, further comprising pigment.

3. The substance as defined in claim 1, further comprising pigment, said pigment is accounting for 40 wt %–60 wt % of said substance.

4. The substance as defined in claim 1 obtained by thermally decomposing synthetic resin.

5. The substance as defined in claim 1 obtained by thermally decomposing waste of synthetic resin.

6. The substance as defined in claim 1 obtained by thermally decomposing a polyolefin.

7. The substance as defined in claim 1 obtained by thermally decomposing a polystyrene resin.

8. The substance as defined in claim 1 whose viscosity is $2.0 \times 10^4$ poise-$1.0 \times 10^5$ poise at 80° C.

9. The substance as defined in claim 1 whose melting peak temperature is 100° C.–120° C.

10. The substance as defined in claim 1 whose hardness is 40 HDD–60 HDD.

11. The substance as defined in claim 1 whose tensile strength is 80 kgf/cm$^2$–100 kgf/cm$^2$.

12. The substance as defined in claim 1 whose bending strength is 0.6 kgf/mm$^2$–0.9 kgf/mm$^2$.

13. The substance as defined in claim 1 whose bending elastic modulus is 40 kgf/mm$^2$–60 kgf/mm$^2$.

14. The substance as defined in claim 2 whose viscosity is $1.0 \times 10^4$ poise-$5.0 \times 10^4$ poise at 80° C.

15. The substance as defined in claim 2 whose tensile strength is 55 kgf/cm$^2$–75 kgf/cm$^2$.

16. The substance as defined in claim 2 whose bending strength is 0.8 kgf/mm$^2$–1.2 kgf/mm$^2$.

17. The substance as defined in claim 2 whose bending elastic modulus is 35 kgf/mm$^2$–55 kgf/mm$^2$.

18. A marking material having a substantially wedge-shaped configuration such that a leading edge of the marking material, for contacting a material to be written on, is formed so that a top surface thereof and an under surface thereof cross each other at an angle of 10° to 30°, said marking material comprising:

pigment; and a hydrocarbon, having a weight ratio of carbon to hydrogen of 5.839 to 6.018, a total weight percent of the carbon and the hydrogen of 98.5 percent to 100 percent, a number-average molecular weight of $3.0 \times 10^3$ to $1.0 \times 10^4$ represented by Mn, a weight-average molecular weight of $1.0 \times 10^4$ to $5.0 \times 10^4$ represented by Mw and Mn/Mw is 1.0 to 5.0.

* * * * *